UNITED STATES PATENT OFFICE.

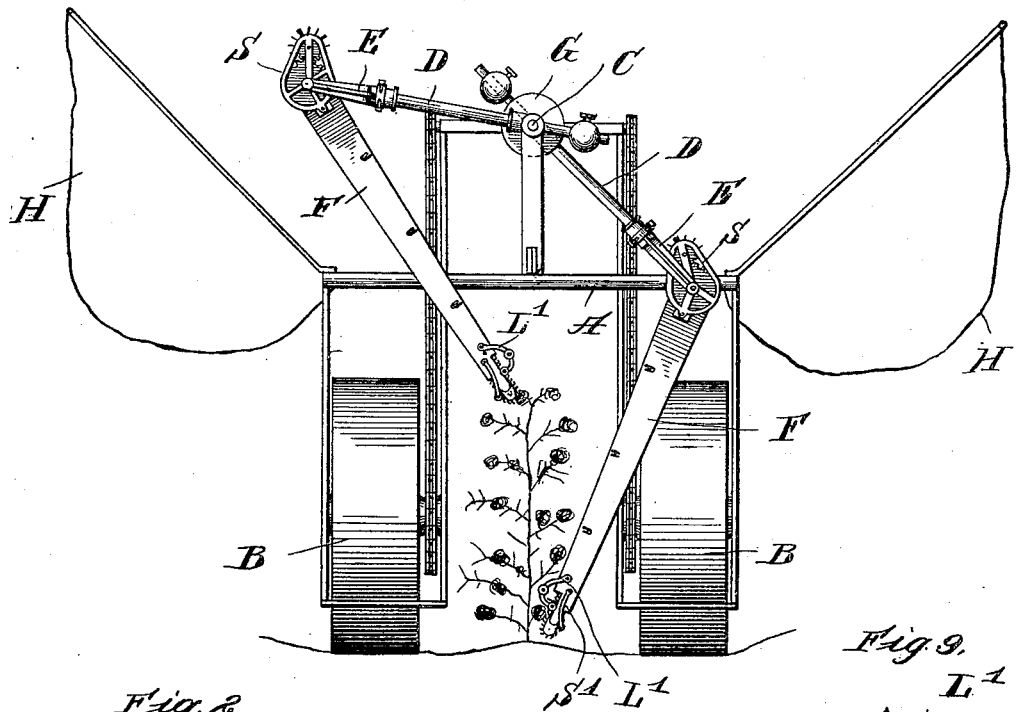
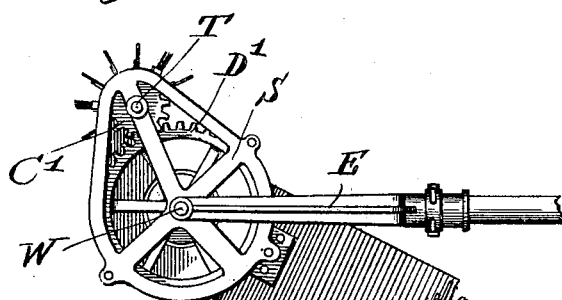
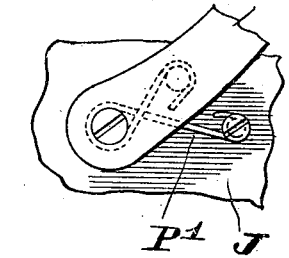
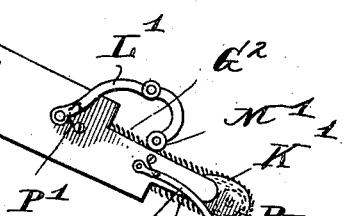

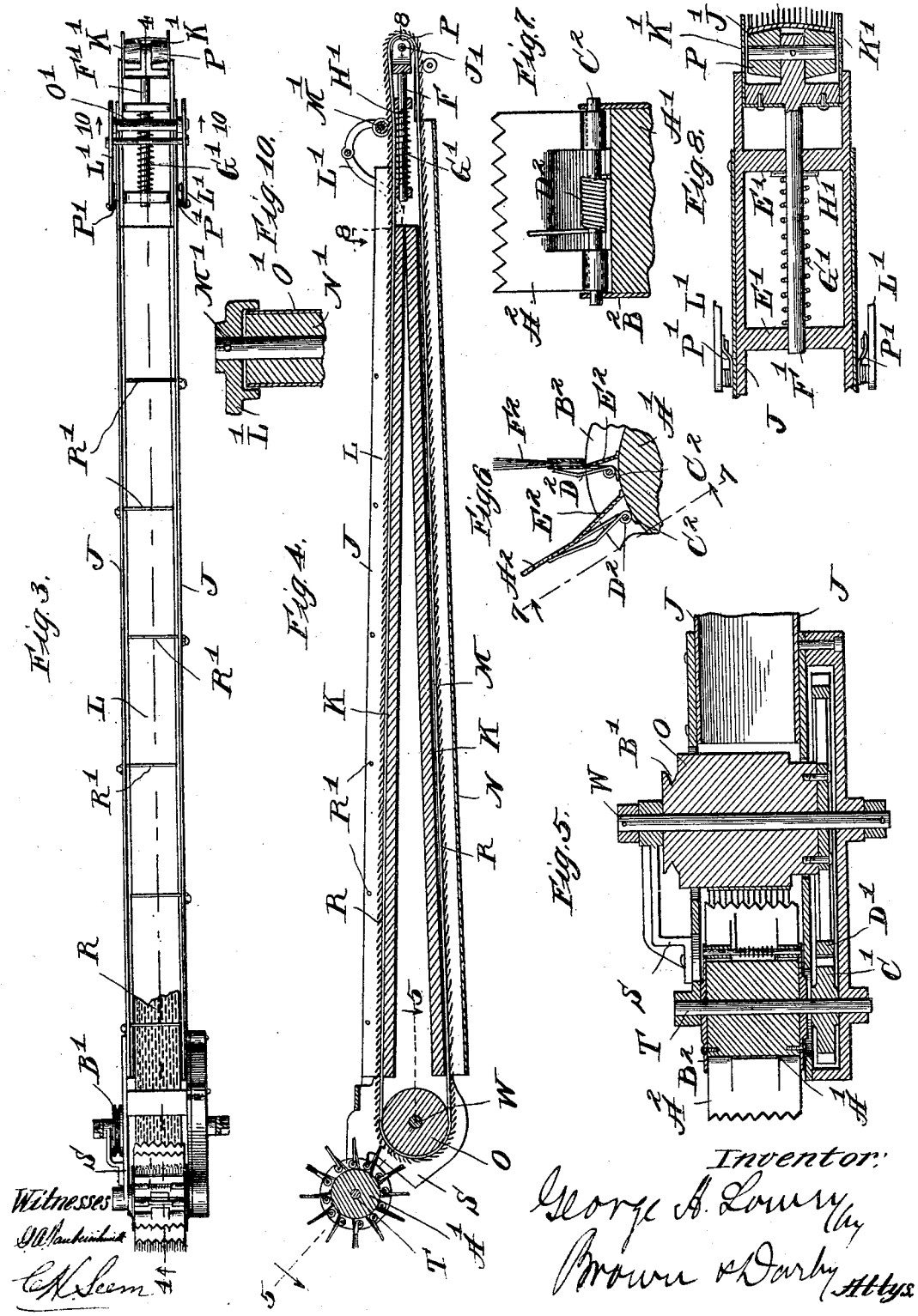

GEORGE A. LOWRY, OF EAST BOSTON, MASSACHUSETTS.

COTTON-PICKING MACHINE.

No. 799,742. Specification of Letters Patent. Patented Sept. 19, 1905.

Application filed January 11, 1905. Serial No. 240,592.

*To all whom it may concern:*

Be it known that I, GEORGE A. LOWRY, a citizen of the United States, residing at East Boston, in the county of Suffolk and State of Massachusetts, have invented a new and useful Improvement in Cotton-Picking Machines, of which the following is a specification.

This invention relates to cotton-picking machines.

The object of the invention is to simplify and improve the construction of apparatus for picking or harvesting cotton and to render the same more efficient in operation.

A further object of the invention is to provide a cotton-picking apparatus wherein a traveling belt having picker-fingers is arranged to be presented for contact with the cotton to be gathered or picked and wherein provision is made of means for effecting an efficient engagement of the cotton with the picking devices.

A further object of the invention is to provide means which are simple and efficient for eliminating or removing any sticks, twigs, burs, hulls, trash, or the like which may adhere to the cotton fiber or which may be carried along with the picking devices.

A further object of the invention is to provide means which are simple and efficient for doffing or removing the picked cotton from the picking devices.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in rear elevation of a cotton-picking machine, showing the application thereto of a picking mechanism embodying the principles of my invention. Fig. 2 is a detached detail broken view, in side elevation, of a picking mechanism embodying the principles of my invention. Fig. 3 is a plan view of the picking mechanism shown in Fig. 2. Fig. 4 is a central longitudinal section of the same on the line 4 4, Fig. 3, looking in the direction of the arrows. Fig. 5 is an enlarged broken detail view in section on the line 5 5, Fig. 4, looking in the direction of the arrows. Fig. 6 is a broken detail view in section, showing a portion of the doffer mechanism. Fig. 7 is a broken detail view in section on the line 7 7, Fig. 6. Fig. 8 is a broken detail view in section on the line 8 8, Fig. 4, looking in the direction of the arrows. Fig. 9 is a broken detail view showing the manner of mounting a presser device employed in connection with my invention. Fig. 10 is an enlarged broken detail view in section on the line 10 10 looking in the direction of the arrows, showing the manner of mounting the presser-device roller.

The same part is designated by the same reference-sign wherever it occurs throughout the several views.

In Patent No. 775,451, issued November 22, 1904, I have shown, described, and claimed a cotton-picking machine embodying pick-up mechanism carried by arms mounted for substantially universal swinging movement, said picking mechanism including a traveling belt having picker fingers or points designed and adapted to be brought into contact with opened cotton, whereby the cotton is engaged by the picker fingers or points of the traveling belt and extracted from the bolls or hulls containing the same and carried by such belt, and which is removed from the belt by suitable doffer mechanism and delivered into a suitable receptacle. The present invention relates to an apparatus of this class and nature and embodies certain features of the picker mechanism whereby the same is rendered more efficient in operation.

In Fig. 1 I have shown my invention as applied to a machine of the general character above referred to and wherein reference-sign A designates a framework which may be of any suitable construction and supported upon wheels B. In suitable bearings upon the framework is journaled a shaft C, adapted to receive rotation from any suitable or convenient source of power. Suitably mounted to rock or swing upon shaft C are counterweighted or counterbalanced arms D, upon the outer or free ends of which are mounted for axial movement relatively thereto yokes E, upon which are pivotally mounted the picker-arms F, carrying the cotton picking or harvesting devices, the latter being actuated in any suitable or convenient manner—as, for instance, through drive-belts—from pulleys G on shaft C, the gathered or picked cotton being delivered from the picking mechanism into suitably and conveniently arranged receptacles, (a form of which is indicated at H.)

The construction so far described embodies generally the construction shown, described, and claimed in my patent above referred to, and in the specific details of the construction and arrangement thereof form no part of my present invention, as the same may be altered or varied throughout a wide scope without departure from the spirit and scope of my invention. As above indicated, the invention resides particularly in the construction of picker mechanism rather than in the manner of mounting and operating the same.

The picker mechanism embodying the principles of my present invention comprises an arm having side plates J, suitably mounted upon the edges of spreader-plates K, thereby forming channels L and M, (see Figs. 3 and 4,) the channel L being open and having the side walls formed by the projecting edges of the side plates J and a bottom wall formed of one of the spreader-plates K. The other channel M is a closed channel, as clearly indicated in Fig. 4, the side walls of which are formed by the plates J, while the top and bottom walls are formed by a spreader-plate K and a cover N, thereby forming an open-ended channel. Suitably mounted at the respective ends of the arm are guide-rollers O P, over which operates an endless belt R, having picker fingers or points, said belt being actuated and in the proper direction in any suitable manner—as, for instance, by imparting rotation to guide-roller O, over which said belt operates—one of the runs or legs of the belt operating in the open channel L of the arm and the other run or leg operating in the closed channel M. A pin W is mounted in bracket S and is secured in the arms of yoke E. The roller O is journaled upon pin W as an axis. In the bracket is also mounted a pin T, upon which is journaled to rotate a roller A', carrying the doffer devices, as will be presently more fully explained. Rotation may be imparted to the rollers O and A' in any suitable or convenient manner—as, for instance, by a belt operating over a grooved pulley B', formed on or connected with roller O, said belt being driven from a pulley G on shaft C—and the rotation of roller O may be transmitted to doffer-roller A' by any suitably-arranged gearing—as, for instance, by pinions C' D', respectively connected to rollers A' and O. In practice I prefer to employ a large pinion D' and a small pinion C', whereby the doffer mechanism is driven at a higher rate of speed than that of the travel of the picker-belt. The guide-roller P at the opposite end of the arm and over which the picker-belt operates is exposed, so that the cotton to be picked or gathered will be engaged by the picker fingers or points when the latter are properly presented to the cotton and extracted from the bolls or hulls and carried along with the belt toward the other end of the arm, where the doffer mechanism, driven at a higher rate of speed than that of the travel of the picker-belt, disengages the cotton from the picker-belt and delivers the same into the receptacle arranged to receive it. In practice the leg or run of the belt which operates in the channel or passage M moves or travels from roller O toward roller P, and that leg or run of the belt which operates in the open channel L travels from roller P toward roller O, and the doffer-roller is arranged to revolve or rotate in the direction of travel of that leg or run of the picker-belt which operates in the open channel, and, rotating at a high rate of speed, efficiently disengages the cotton from the picker-fingers of the belt and delivers the same therefrom.

I will now call attention to a feature of my present invention which I regard as of value in the practical operation of a machine embodying the principles of my invention and that is the construction and manner of mounting the guide-roller P. In suitable guide-blocks E', formed between the side plates J of the arm, is mounted a rod F', arranged to slide longitudinally of the arm. A spring G', arranged to bear at one end against a pin H', carried by rod F', and at the other end against one of the guide-blocks E', serves to impart a yielding tension tending to force rod F' outwardly in the direction of the length of the picker-arm. On its outer end rod F' carries a transverse pin J', on the ends of which are mounted to rotate conical blocks constituting and forming the roller P and over which the picker-belt travels. In practice I propose to employ a flat picker-belt of a width of two inches, more or less, and by employing a roller made in conical sections with the ends of largest diameter presented toward each other over which the belt operates the tendency of the belt to slide off its guide-roller is avoided and obviated. It will also be observed that the pin J', upon which these roller-sections are mounted, is secured in the end of rod F', while the roller-sections are merely slipped over the projecting ends of such pin. The purpose of this is to prevent the fibers of cotton from being caught and wrapped or wound around the spindle or pin J' or the ends thereof during the operation of the device, the ends of the pin J' lying flush with the outer end surfaces of the roller-sections, thereby avoiding any projecting portions which would afford a bearing around which the cotton might become wound or wrapped. In order to retain the roller-sections upon the ends of pin J' and at the same time to form side guides for the belt during its travel around the roller, I mount side plates K' upon the rod F' and arrange the same to extend in proximity to and parallel with the end surfaces of the roller-sections, as clearly shown. From the foregoing description it will be observed that the guide-roller at this end of the picker-arm, over which the picker-belt operates, is mounted under a yielding tension exerted thereon in a direction to normally maintain the picker-belt taut, so as to take up any wear, while at the same time any tendency of the belt to slide off the roller endwise is obviated and the belt efficiently guided, and I avoid the danger of the cotton fibers becoming wrapped around the spindle or pin upon which the roller-sections are mounted.

In the practical operation of a picker mechanism embodying the principles of the invention set forth, described, and claimed in my prior patent I have found that frequently a boll, hull, twig, dried leaf, stick, or the like becomes broken off during the manipulation of the arm in the process of picking the cotton and gets caught in the picker-belt or remains adhering to the fibers of the cotton and is carried along with the cotton by the belt, the belt being exposed at and adjacent to the guide-roller P over which it operates, so that it may be carried into contact with the cotton to be picked. I have also found that it is exceedingly desirable to secure an efficient engagement of the picking fingers or points of the belt with the fibers of the cotton in order to prevent the cotton from dropping or falling after being extracted from the hull of the boll, and thereby falling to the ground, necessitating another manipulation of the arm to recover it. In order to avoid these objections and to provide a construction wherein the cotton is caused to be efficiently engaged by the picker fingers or points of the belt, and wherein the hulls, twigs, leaves, trash, and the like which may adhere to the fibers of the cotton being picked or which may be broken off and carried along with the cotton by the belt may be crushed or broken and to some extent separated or ejected from the cotton and eliminated or thrown out, I propose to provide means for efficiently crowding the cotton down upon the belt as soon as it is engaged by the picker fingers or points thereof, thereby insuring an efficient engagement of such fingers or points with the cotton, said means also operating to crush or to break up and to some extent discard any adhering twig, hull, leaves, trash, or the like. Many specifically different constructions may be provided for accomplishing this result. While, therefore, I have shown and will now describe an exceedingly-simple device of this character and for the purpose stated, I do not desire to be limited or restricted thereto, as changes therein and variations therefrom would readily occur to persons skilled in the art and still fall within the spirit and scope of my invention. In the particular form shown I employ a presser device and apply the same to the picker-arm adjacent the point where the cotton is first engaged by the picker-belt to crowd or press the same down upon the belt, mounting such presser device yieldingly, so as to enable it to perform its functions properly. This presser device in the particular form shown comprises a yoke L', the arms of which are arranged to straddle the picker-arm and are pivotally mounted upon the side plates thereof. At their free ends the arms of yoke L' carry a pin M', upon which is loosely mounted a roller N', (see Fig. 10,) a wearing-sleeve O' being mounted upon said roller. The side arms of yoke L' are formed with cup-shaped seats in which are received the ends of roller N' and sleeve O', thus preventing the possibility of the fibers of cotton becoming engaged and wrapped around the pin M', upon which said roller and sleeve are mounted. This roller and its wearing-sleeve extends transversely across the picker-arm and over the path of travel of the belt operating thereon and at or adjacent the point where such belt is applied to the cotton to extract or pick the same, and said yoke is yieldingly held in position for the bearing-roller to be yieldingly pressed down upon the belt, the cotton when engaged by the picker-fingers of the belt being carried underneath said presser-roller in the travel of this leg or run of the belt toward the doffer end of the picker-arm. The side arms, constituting the yoke L', are in the form of goosenecks extending above the picker-arm, for a purpose presently to be referred to. The presser device may be yieldingly pressed or held crowded down toward or upon the belt in any convenient manner—as, for instance, by means of a spring P', (see Figs. 2, 8, and 9)—thereby causing the cotton carried by the belt to be crowded down into position to be efficiently engaged by the picker-fingers. In case a bur, twig, leaf, trash, or other matter adheres to the fibers of the cotton or is carried along with the belt the presser device normally tends to prevent the passage of such twig, bur, or the like thereunder and along with the belt. If, however, such bur, twig, trash, or the like is too firmly engaged by the belt or adheres too firmly with the fibers of the cotton to be excluded by the presser device, the yielding mounting of the presser device enables the same to rock sufficiently to permit such bur, twig, or the like to pass underneath, the gooseneck shape of the side arms of the yoke permitting such free passage and preventing choking or clogging thereunder and preventing the roller from being maintained in raised position and permitting it to return immediately to its normal position after the bur, twig, or the like has passed thereunder. It sometimes happens that burs, twigs, or the like are thus carried along with the cotton by the belt and past the presser-roller, and it becomes important to exclude such burs, twigs, or the like and to prevent the same from being delivered from the picking device along with the cotton. To this end I make the channel on the upper side of the arm and along which the leg or run of the belt travels toward the doffer end of the arm with an open upper side, and I arrange spring-fingers R' to project or extend across this open passage and somewhat above the plane of travel of the belt and against which such burs, twigs, or the like are brought, the spring-fingers operating to disengage the burs, twigs, or the like from the fibers of the cotton and to flick or eject the same out of the channel through the open side thereof and over its side walls. These spring-fingers may, if desired, be projected transversely across the channel alternately from opposite sides thereof. This I regard as a most important and valuable feature of my invention in that it provides means for ejecting or removing any hull, twig, leaves, trash, or the like from the cotton during the picking operation and preventing the same from being delivered from the picking mechanism along with the cotton, and while I have shown spring-fingers operating in connection with an open-sided trough or channel through which a picker-belt travels as one specific form of ejector means embodying the principles of my invention I do not desire to be limited or restricted thereto, as variations therefrom and changes in the details of construction thereof would readily occur to persons skilled in the art and still fall within the spirit and scope of my invention.

In the operation of a picker-arm embodying my invention the exposed picker-belt is presented to the opened cotton at a point adjacent the free end of the picker-arm and from either the top or bottom side thereof or at the extreme end. It frequently happens that where cotton is engaged by the picker-belt on the under side of the picker-arm the travel of the belt thereafter around the guide-roller and at a comparatively high speed causes the cotton, if not efficiently engaged by the picker-fingers of the belt, to be thrown off or disengaged from the belt through centrifugal action. To prevent this and also to provide means for excluding any adhering bur, twig, or the like, I propose to employ a presser device and apply the same to the under side of the arm at the picking end thereof, which may be similar in construction and arrangement and manner of mounting to the presser device L', above referred to. I have indicated such a device at S' in Figs. 1 and 2.

In the operation of a picker-arm embodying the construction above described the cotton after being extracted from the bolls or hulls and progressed through the open channel L of the arm by the travel of the belt, and after the hulls, twigs, leaves, trash, or the like are removed and excluded, as above explained, finally reaches a point where it is to be delivered from the picking mechanism. This delivery is effected by a doffer-roller A', and which, as above indicated, is mounted to rotate in the same direction, but at a higher rate of speed than the speed of travel of the leg or run of the picker-belt which operates in the open channel L. In my patent above referred to I have described, shown, and claimed a doffer for accomplishing this object, wherein the doffer-roller is provided with brushes which operate to strip the cotton from the picker-belt and to deliver the same from the picking mechanism into a suitable receptacle. I have found in practice, however, that where the doffer-brushes are rigid or possess merely a natural resiliency the danger is incurred of a twig, branch, hull, or other trash which has escaped the ejecting mechanism during the travel of the picker-belt to the point of operation of the doffer forming an obstruction or enlargement against which the rapidly-moving doffer-brushes strike, thereby breaking the brushes off and otherwise choking, clogging, or interfering with the proper operation of the doffer, and, moreover, where all the brushes are metallic plates I have found that the throat or passage between the doffer and the path of travel of the belt and through the bracket in which are mounted the doffer and the roller over which the belt operates is not properly and efficiently cleared. In order to avoid these objections and to provide a construction of doffer wherein the brushes are permitted to yield sufficiently in case of an undue enlargement of the mass of cotton presented to the action of the doffer or in case a brush of the doffer should strike a hull, twig, or the like which has not been ejected, thereby avoiding the possibility of the doffer-brushes being broken off or injured, and in carrying out my invention I pivotally mount each of the metallic plates $A^2$ of the doffer and arrange a spring and a coöperating stop for each of said brush-plates, whereby said brush-plates may yield in a direction opposite to that in which the doffer-roller is driven. To this end I provide the doffer-roller A' with circular end flanges $B^2$, in which are mounted at suitable intervals the ends of transversely-extending pins $C^2$. Upon each pin is hinged a plate $A^2$. A spring $D^2$ is coiled upon each pin $C^2$ and has one end thereof bearing against the roller A' and the other end against the associated brush-plate $A^2$, the tension of said spring being exerted upon the brush-plate, tending to rock the same normally in a direction for a stop $E^2$, formed on or carried by the brush-plate, to bear against the peripheral surface of the doffer-roller, while at the same time permitting the brush-plate to readily yield in the opposite direction. By this construction any undue enlargement encountered by the brush-plates during the rapid rotation thereof is accommodated without injury to the doffer by the brush-plate yielding backwardly with reference to the direction of rotation of the doffer, thereby permitting sufficient clearance to enable the obstruction to pass on through, the brush-plate being instantly returned or restored to its normal position as soon as the obstruction has been passed over, and in order to secure the best results I have found it advantageous to intersperse bristle brushes with the brush-plates of the doffer, the bristle brushes aiding in clearing the passage-way. These bristle brushes are indicated by reference-sign $F^2$, and are mounted on pins $C^2$ with springs $D^2$, and are provided with stops $E^2$, similar in construction and arrangement to the mounting of the brush-plates $A^2$, whereby said bristle brushes are permitted to yield in a rearward direction with reference to the direction of rotation of the doffer.

As above indicated, a picker-arm embodying the principles of construction described is designed to be carried by a suitably-counterbalanced arm pivotally mounted upon a drive-shaft, the picker-arm being thus mounted for substantially universal movement and being dirigible by an operator or attendant, so as to present the free end thereof, or rather the exposed surface of the picker-belt, to the cotton to be picked, the picker-belt being driven and operated as above indicated or in any other suitable or convenient manner. In order to properly expose the surface of the picker-belt at the free end of the picker-arm so that such belt may be properly presented to the cotton for the picking fingers or points to engage the same, I propose to cut away the side plates J, as at $G^2$, (see Fig. 2,) at the free end of said arm, both on the upper side and also on the lower side of such arm.

It is believed that the operation of the device will be readily understood from the foregoing description, taken in connection with the accompanying drawings, and, briefly, is as follows: The machine carrying the picking mechanism is suitably propelled or progressed through the cotton-field and along the rows of cotton-stalks containing the cotton to be picked. Rotation is imparted to the main drive and pivot shaft C, the power being transmitted from said shaft to impart a travel to the picker-belt and the doffer. An operator directing the movements of the arm presents the exposed surfaces of the picker-belt at the free end of the arm to the opened cotton, either at a point on the upper side of said arm or at a point on the lower side of such arm. The picker-fingers with which the picker-belt is provided becoming engaged with the fibers of the cotton extract the cotton from the bolls or hulls containing the same and carries the cotton along with the belt toward the doffer end of the arm. As the cotton thus engaged by the picker-fingers is carried underneath the presser device it is crowded or pressed down upon the picker-belt, thereby insuring an efficient engagement of the picker-fingers therewith, and in case the exposed picker-belt on the under side of the arm is engaged by the cotton the crowding of the cotton down upon the belt prevents the cotton from being thrown off by centrifugal action as the belt passes up and over the guide-roller P, and in case a hull, cotton-boll, twig, or other trash should be broken off and remain adhering to the engaged cotton, so as to be carried along with the belt, the presser devices tend to sever the adherence of such hull, twig, or the like with the fibers of the cotton and to prevent the same from being carried along with the cotton, said presser devices yielding, however, to permit the passage thereunder of such twig, hull, or the like in case of failure to completely detach the same, whereupon the belt traveling through the open-sided channel on the upper side of the arm carries the hull, twig, or the like successively against the transversly extending or projecting spring-fingers $R'$, by which they are eventually ejected, the cotton passing on to the action of the doffer-roller, the spring-brushes and plates of which, operating at a higher rate of speed than and in the same direction as the belt, serving to detach the cotton from the belt and to deliver the same from the picking mechanism, and in case an undue obstruction is encountered by the spring-mounted brushes and plates of the doffer said plates and brushes yield sufficiently to permit the obstruction to pass through without injury to the doffer. The provision of an open channel-way in which the belt operates enables the hulls, sticks, twigs, or the like to be ejected from the machine by the spring-fingers, past and against which such hulls, twigs, or the like are carried. The picker-belt is prevented from displacement from the guide-roller at the free end of the arm by reason of the use of conical-shaped roller-sections, and by mounting said roller-sections upon the ends of their supporting-pin the danger of the cotton fibers becoming wound around the roller-axle is avoided. The provision of the spreader-plates K, along and in contact with which the picker-belt operates and constituting the bases of the channels, serve not only to suitably and properly separate the side plates J, but also to prevent the cotton from catching or being obstructed in its feed. By arranging one run of the picker-belt to travel in a closed channel the operator is enabled to grasp the arm in order to direct it properly in the operation of picking the cotton and without danger of injury by reason of the picker points or fingers coming in contact with his hands.

As above indicated, many variations and changes in the details of construction and arrangement would readily occur to persons skilled in the art and still fall within the spirit and scope of my invention. I do not desire, therefore, to be limited or restricted to the exact details of construction shown and described; but, Having now set forth the object and nature of my invention and a construction embodying the principles thereof, what I claim as new and useful and of my own invention, and desire to secure by Letters Patent, is—

1. In a cotton-picking machine, a picker-arm comprising side plates and interposed spreader-plates forming channels, one of said channels being open and the other closed, and a picker-belt operating in said channels.

2. In a cotton-picking machine, a picker-arm having guide-rollers arranged at each end thereof, a picker-belt operating over such rollers, side plates between which said picker-belt operates, spreader-plates for separating said side plates, and forming channels to receive the picker-belt, one of said channels having an open side and the other channel being closed.

3. In a cotton-picking machine, a picker-arm, a picker-belt operating thereon, rollers mounted adjacent the ends of said arm, over which said belt operates, means for driving one of said rollers, the other of said rollers being made in sections, and means for yieldingly supporting said sections.

4. In a cotton-picking machine, a picker-arm having a drive-roller at one end and a yieldingly-mounted rod at the other end, a transverse pin carried by said rod, and roller-sections mounted on the ends of said pin, and a picker-belt operating over said rollers.

5. In a cotton-picking machine, a picker-arm having a roller arranged at one end, a transversely-extending pin mounted at the other end of said arm, roller-sections mounted upon the ends of said pin, and a picker-belt operating over said rollers.

6. In a cotton-picking machine, a picker-arm, a roller mounted at one end of said arm, a transversely-extending pin arranged at the other end of said arm, and conical roller-sections mounted upon the ends of said pin, the enlarged ends of said roller-sections presented toward each other, and a picker-belt operating over said rollers.

7. In a cotton-picking machine, a picker-arm, a roller mounted at one end of said arm, a transversely-extending pin arranged at the other end of said arm, roller-sections mounted upon the ends of said pin, the outer end surfaces of said roller-sections lying flush with the ends of said pin, and a picker-belt operating over said rollers.

8. In a cotton-picking machine, a picker-arm, a roller arranged at one end of said arm, roller-sections arranged at the other end of said arm, a pin upon which said roller-sections are mounted, the outer end surfaces of said roller-sections lying flush with the ends of said pin, and retaining-plates arranged adjacent the outer ends of said roller-sections, and a picker-belt operating over said rollers.

9. In a cotton-picking machine, a picker-arm, a roller arranged at one end of said arm, a transversely-extending pin yieldingly mounted at the opposite end of said arm, roller-sections carried by said pin, a picker-belt operating over said rollers, and retaining-plates arranged at the ends of said roller-sections and forming guides for the picker-belt.

10. In a cotton-picking machine, a picker-arm, a picker-belt operating thereon, and yielding means for pressing the picked cotton into engagement with the picker-belt.

11. In a cotton-picking machine, a picker-arm, a picker-belt operating thereon, and a yielding presser device carried by said arm and operating to press the cotton into engagement with the picker-belt.

12. In a cotton-picking machine, a picker-arm, a picker-belt operating thereon, and a yieldingly-mounted presser device operating to press the cotton into engagement with the picker-belt.

13. In a cotton-picking machine, a picker-arm, a picker-belt operating thereon, a spring-mounted presser device extending transversely across the picker-belt, and operating to press the cotton into engagement with the picker-belt.

14. In a cotton-picking machine, a picker-arm, a picker-belt operating thereon, a yoke having arms arranged to straddle the picker-arm and carrying a transversely-extending roller, and means for yieldingly pressing said roller toward the picker-belt.

15. In a cotton-picking machine, a picker-arm, a picker-belt operating thereon, a yoke comprising gooseneck side arms arranged to straddle, and pivotally connected to, the picker-arm, a roller connecting said side arms, and means for yieldingly pressing said roller toward the picker-belt.

16. In a cotton-picking machine, a picker-arm comprising side plates, means for separating said plates to form an open trough or channel therebetween, a picker-belt operating in said channel, said side plates being cut away at the free end of said arm to expose the picker-belt, and means adjacent to the exposed portion of the picker-belt for crowding the cotton into contact with such picker-belt.

17. In a cotton-picking machine, a dirigible picker-arm having side plates arranged to form an open trough or channel therebetween, a picker-belt arranged to operate in said channel, and means for ejecting twigs, hulls, or the like, from said channel.

18. In a cotton-picking machine, the combination with cotton-picking devices including a pivotally-mounted picker-arm carrying picking mechanism, a doffer and means carried by said arm for separating from the picked cotton and eliminating therefrom hulls, twigs, trash, or the like, during the picking operation.

19. In a cotton-picking machine, the combination with cotton-picking devices including a pivotally-mounted picker-arm carrying picking mechanism, a doffer, and means carried by said arm for automatically separating from the picked cotton and ejecting any adhering hulls, twigs, or the like.

20. In a cotton-picking machine, a dirigible picker-arm, a picker-belt operating thereon, a doffer and means arranged adjacent the path of operation of the picker-belt for separating and ejecting hulls, twigs, trash, or the like, from the picked cotton.

21. In a cotton-picking machine, a picker-arm, a picker-belt operating thereon, and spring-fingers arranged adjacent the path of operation of the picker-belt to eject hulls, twigs, trash, or the like, from the picked cotton.

22. In a cotton-picking machine, a picker-arm comprising side plates arranged to form a channel therebetween, a picker-belt operating through said channel, and spring-fingers projecting transversely across said channel and adjacent the path of operation of the picker-belt.

23. In a cotton-picking machine, a picker-arm including side plates arranged to form a channel therebetween, a picker-belt operating in said channel, and spring-fingers arranged to project alternately from opposite sides of said channel transversely thereacross.

24. In a cotton-picking machine, a picker-belt, and means for operating the same, in combination with a doffer-roller having brushes, said brushes being pivotally mounted to yield backwardly with reference to the direction of rotation of said roller, and means for rotating said roller.

25. In a cotton-picking machine, and in combination with a picker-belt, and means for operating the same, a doffer-roller, means for rotating said roller in the direction of travel of said belt, but at a higher speed, said doffer-roller carrying pivotally-mounted spring-pressed brushes.

26. In a cotton-picking machine, and in combination with a picker-belt, and means for driving the same, a doffer-roller carrying interspersed brush-plates and bristle brushes, said doffer-roller journaled to rotate adjacent the path of travel of that portion of said belt which conveys the picked cotton from the picking-point, and means for driving said doffer-roller at a higher peripheral speed than the speed of travel of the picking-belt.

27. In a cotton-picking machine, and in combination with a picker-belt, a doffer-roller having interspersed pivotally-mounted spring-pressed brush-plates and bristle brushes, means for driving said picker-belt and doffer-roller, said driving means operating to drive the doffer-roller at a higher rate of speed than the speed of travel of the belt, said doffer-roller being arranged adjacent that portion of said belt which conveys the picked cotton from the picking-point.

28. In a cotton-picking machine, and in combination with a picker-belt, and means for operating the same, a doffer-roller, a pin upon which said roller is mounted to revolve, end plates for said roller, pins mounted in said end plates, brushes pivotally mounted upon said pins, said brushes provided with stops, and means for yieldingly pressing said brushes into the limit of movement permitted by said stops.

29. In a cotton-picking machine, the combination with a picker-belt, of a doffer-roller, pivotally-mounted brushes mounted thereon, stops for limiting the extent of rocking movement of said brushes about their pivots, and means for yieldingly pressing said brushes against said stops.

30. In a cotton-picking machine, a picker-arm comprising plates arranged to form channels, one of said channels being open and the other closed, and a picker-belt operating in said channels.

31. In a cotton-picking machine, a picker-arm comprising plates arranged to form channels, said channels being separated from each other, one of said channels being open and the other closed, and a picker-belt operating through said channels.

32. In a cotton-picking machine, a picker-arm comprising plates arranged to form a channel therebetween, said channel being open, a picker-belt operating through said channel, and means for ejecting hulls, twigs, trash, or the like, through the open side of said channel.

In witness whereof I have hereunto set my hand, this 27th day of December, 1904, in the presence of the subscribing witnesses.

GEORGE A. LOWRY.

Witnesses:
C. H. SEEM,
E. C. SEMPLE.